(12) United States Patent
Cai et al.

(10) Patent No.: US 11,445,558 B1
(45) Date of Patent: Sep. 13, 2022

(54) MULTI-ACTIVE ELECTRONIC SUBSCRIBER IDENTITY MODULE PROFILES FOR MULTI-SERVICE USER EQUIPMENT

(71) Applicant: T-MOBILE INNOVATIONS LLC, Overland Park, KS (US)

(72) Inventors: Zheng Cai, Fairfax, VA (US); Zheng Fang, Mclean, VA (US); David Zhijun Sun, Broadlands, VA (US); Yu Wang, Fairfax, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 89 days.

(21) Appl. No.: 16/950,849

(22) Filed: Nov. 17, 2020

(51) Int. Cl.
| | | |
|---|---|---|
| *H04W 8/20* | (2009.01) | |
| *H04W 8/22* | (2009.01) | |
| *H04W 76/15* | (2018.01) | |
| *G06F 9/54* | (2006.01) | |
| *H04W 8/18* | (2009.01) | |
| *H04W 12/72* | (2021.01) | |

(52) U.S. Cl.
CPC ............ *H04W 76/15* (2018.02); *G06F 9/541* (2013.01); *H04W 8/18* (2013.01); *H04W 12/72* (2021.01)

(58) Field of Classification Search
None
See application file for complete search history.

(56) References Cited

U.S. PATENT DOCUMENTS

| 11,051,220 B1 | 6/2021 | Song et al. |
|---|---|---|
| 2010/0214943 A1 | 8/2010 | Immendorf et al. |
| 2012/0302240 A1 | 11/2012 | Tamaki et al. |
| 2018/0302824 A1 | 10/2018 | Christopherson et al. |
| 2021/0068046 A1 | 3/2021 | Mestanov et al. |
| 2022/0014900 A1* | 1/2022 | Gandhi ................. H04W 8/205 |

OTHER PUBLICATIONS

Gai, Zheng, et al., "User Equipment (UE) Group Handoff," filed Feb. 12, 2021, U.S. Appl. No. 17/174,418.
Office Action dated Apr. 22, 2022, filed Feb. 12, 2021 U.S. Appl. No. 17/174,418.

* cited by examiner

*Primary Examiner* — Gary Lafontant

(57) ABSTRACT

A wireless communication device for establishing two different user equipment (UE) radio access network (RAN) attachments. The wireless communication device comprises an application processor; a baseband processor; a non-transitory memory; a virtual user equipment (UE) application stored in the non-transitory memory that, when executed by the application processor as a first virtual UE instance accesses a first eSIM profile stored in the non-transitory memory, establishes a first UE attachment to a radio access network based on credentials accessed from the first eSIM profile, and conducts a first wireless communication session via the first UE attachment, and when executed by the application processor as a second virtual UE application instance accesses a second eSIM profile stored in the non-transitory memory, establishes a second UE attachment to a radio access network based on credentials accessed from the second eSIM profile, and conducts a second wireless communication session via the second UE attachment.

20 Claims, 9 Drawing Sheets

MULTI-ACTIVE ELECTRONIC SUBSCRIBER IDENTITY MODULE PROFILES FOR MULTI-SERVICE USER EQUIPMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication device (e.g., a user equipment (UE)) may attach to a radio access network (RAN), for example attach to a cell site, by providing various credentials used by the RAN to establish an identity of the UE and determine if that UE is associated with an active wireless communication service subscription plan. The UE may store at least some of these credentials in a subscriber identity module (SIM). Conventional SIM cards are removable by lay users. By removing a first SIM from the UE and installing a second SIM into the UE a user might change the identity of the UE, for example to transfer wireless communication service from a first service provider to a second different service provider.

Recently an embedded SIM (eSIM) technology has been gaining in popularity. An eSIM is a chip that is non-removably attached to the UE, for example attached to a circuit board of the UE. The eSIM provides much of the same functionality and data that a conventional SIM provides. Unlike the conventional SIM, an eSIM may be updated with different credentials, for example by electronically writing to the eSIM. The credentials stored by an eSIM may be referred to as an eSIM profile. The eSIM profile may be considered to be a bundle or package of data and/or applications that, at least in part, enable the UE to attach to a RAN and to conduct wireless communication sessions. Some eSIMs may store two or more separate eSIM profiles. By deactivating a first stored eSIM profile and subsequently activating a second stored eSIM profile, the UE may be able to switch its UE identity and possibly change wireless communication service providers. Speaking generally, an eSIM profile defines wireless communication service provider data and wireless communication service subscriber data. More specifically, an eSIM profile may define a phone number or a mobile subscriber identity (MSID) or an international mobile subscription identity (IMSI), one or more network access keys, one or more network access credentials, encryption keys, preferred roaming lists (PRLs), executable applications, branding content, and/or other data.

SUMMARY

In an embodiment, a method of wirelessly communicating by a wireless communication device using two different embedded subscriber identity module (eSIM) profiles to establish two different user equipment (UE) radio access network (RAN) attachments concurrently is disclosed. The method comprises accessing a first eSIM profile stored in a physical UE by a first virtual UE instance executing on a processor of the physical UE, establishing a first UE attachment to a radio access network by the first virtual UE instance based on credentials accessed from the first eSIM profile, and conducting a first wireless communication session by the first virtual UE instance via the first UE attachment. The method further comprises accessing a second eSIM profile stored in the physical UE by a second virtual UE instance executing on the processor of the physical UE, establishing a second UE attachment to a radio access network by the second virtual UE instance based on credentials accessed from the second eSIM profile, and conducting a second wireless communication session by the second virtual UE instance via the second UE attachment at the same time that the first virtual UE is conducting the first wireless communication session via the first UE attachment.

In another embodiment, a wireless communication device for establishing two different user equipment (UE) radio access network (RAN) attachments concurrently is disclosed. The wireless communication device comprises a radio transceiver, a baseband processor communicatively coupled to the radio transceiver providing a software interface to support a plurality of virtual user equipment (UE) application instances concurrently, an application processor communicatively coupled to the baseband processor, a non-transitory memory, and a virtual UE application stored in the non-transitory memory. When the virtual UE application is executed by the application processor as a first virtual UE application instance, the first virtual UE application instance accesses a first eSIM profile stored in the non-transitory memory, establishes a first UE attachment to a radio access network via the software interface of the baseband processor based on credentials accessed from the first eSIM profile, and conducts a first wireless communication session via the first UE attachment. When the virtual UE application is executed by the application processor as a second virtual UE application instance concurrent with the first virtual UE application instance, the second virtual UE application instance accesses a second eSIM profile stored in the non-transitory memory, establishes a second UE attachment to a radio access network via the software interface of the baseband processor based on credentials accessed from the second eSIM profile, and conducts a second wireless communication session via the second UE attachment at the same time the first virtual UE application instance conducts the first wireless communication session.

In yet another embodiment, a wireless communication device for establishing two different user equipment (UE) radio access network (RAN) attachments is disclosed. The wireless communication device comprises, comprising a radio transceiver, a baseband processor communicatively coupled to the radio transceiver providing a software interface to support a plurality of virtual user equipment (UE) application instances, an application processor communicatively coupled to the baseband processor, a non-transitory memory, and a virtual user equipment (UE) application stored in the non-transitory memory. When the virtual UE application is executed by the application processor as a first virtual UE instance the first virtual UE application instance accesses a first eSIM profile stored in the non-transitory memory, establishes a first UE attachment to a radio access network via the baseband processor based on credentials accessed from the first eSIM profile, and conducts a first wireless communication session via the first UE attachment. When the virtual UE application is executed by the application processor as a second virtual UE application instance, the second virtual UE application instance accesses a second eSIM profile stored in the non-transitory memory, establishes a second UE attachment to a radio access network via the baseband processor based on credentials accessed from the second eSIM profile, and conducts a second wireless communication session via the second UE attachment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
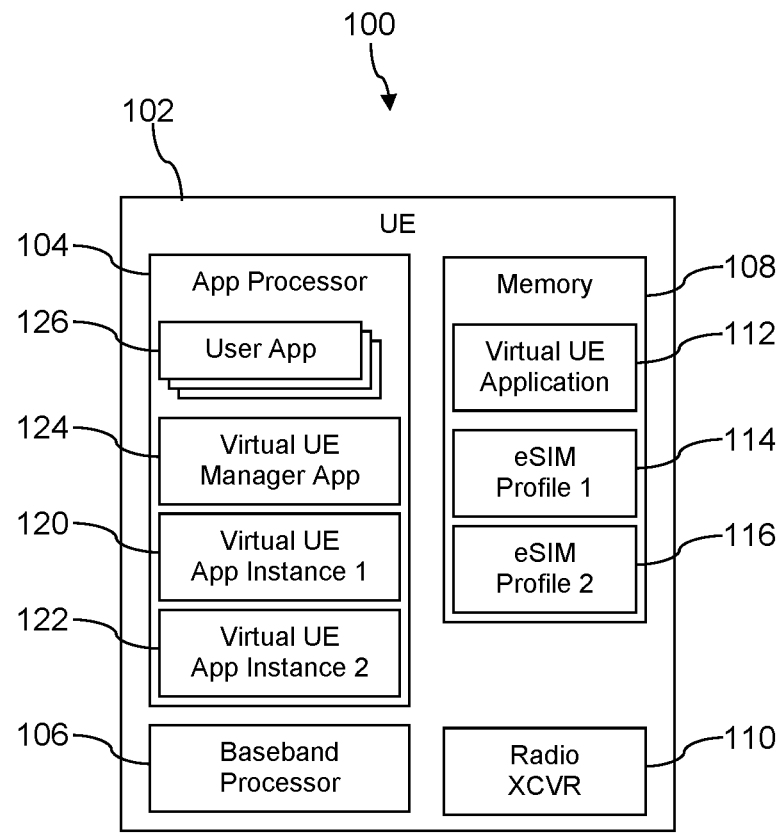
FIG. 1A is a block diagram of a communication system according to an embodiment of the disclosure.
Figure 1A:
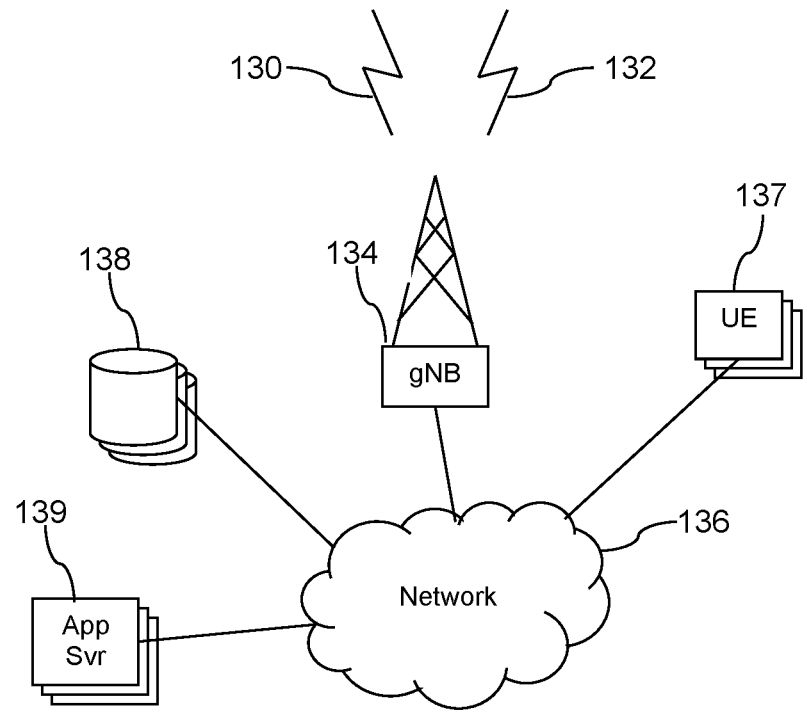

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a physical user equipment (UE) that provides two or more concurrent virtual UEs. By providing concurrent virtual UEs, new and desirable user functions can be provided, such as providing concurrent access to two different subscription accounts from a single physical UE which otherwise is not possible from a single physical UE, providing concurrent communication access to two different wireless communication networks which otherwise is not possible from a single physical UE, providing concurrent access on the same physical UE to applications that are required to be segregated from each other by security considerations which otherwise is not possible from a single physical UE. A virtual UE is an executing instance of a virtual UE application or software program that executes on an application processor of the physical UE. Each different virtual UE instance establishes a UE attachment to a cell site using a dedicated eSIM profile stored in the physical UE, for example stored in an eSIM chip. A virtual UE provides a set of cellular wireless communication functions through interaction with a baseband processor. The set of communication functions can comprise voice communication, data communication, text messages, email, and other communication functions. Further details are provided below.

The present disclosure teaches a physical UE that provides a plurality of concurrent wireless communication sessions, where each different wireless communication session is associated with a different eSIM profile. For example, the UE may establish a first wireless UE attachment according to a first eSIM profile with a cell site to conduct a first wireless communication session and establish a second wireless UE attachment, concurrent with the first wireless attachment, according to a second eSIM profile with a cell site to conduct a second wireless communication session. The first UE attachment and the second UE attachment may wirelessly attach to the same cell site or they may wirelessly attach to different cell sites.

In an embodiment, the physical UE instantiates two concurrent virtual UEs: a first virtual UE may wirelessly communicate via a first wireless UE attachment to a cell site and a second virtual UE may wirelessly communicate via a second wireless UE attachment to a cell site (the same cell site or a different cell site from the cell site providing the first wireless attachment). The first virtual UE and the second virtual UE may be separate instantiations of a virtual UE application, where the two separate instances of the virtual UE application execute on an application processor of the physical UE. While throughout this disclosure the example descriptions focus on the physical UE supporting two wireless communication sessions associated with different UE attachments each established based on different eSIM profiles, it is understood that in some circumstances it may be advantageous for the physical UE to support three or more different communication sessions, where each different communication session is associated with a different UE attachment established based on a different eSIM profile. The teachings of this application are readily extended to the use case of three or more different communication sessions where each different communication session is associated with a different UE attachment to a cell site established by a different virtual UE instance executing on the physical UE.

A physical UE being able to maintain a plurality of separate wireless UE attachments to a radio access network (RAN) and a plurality of separate wireless communication sessions provides desirable benefits for users. For example, a law enforcement officer (LEO) may be prohibited from accessing a free social networking application on the same UE on which he or she accesses proprietary LEO applications. But yet, it may be useful for the LEO, in the line of duty, to access a social media account of a suspect under investigation via the social networking application. In the past, this would compel the LEO to carry two phones with him. The physical UE supporting a plurality of concurrent virtual UE instances taught by the present disclosure can overcome this problem by allowing the LEO to use one physical UE to access both the proprietary application via a first virtual UE instance and the social networking application via a second virtual UE instance.

In another use case, a user may maintain two separate wireless communication service subscriptions for the same physical UE. The two separate subscription accounts may be with the same wireless communication service provider or with two different wireless communication service providers. The user may use a first subscription on a first virtual UE instance and a second subscription on a second virtual UE instance. The different subscriptions may be associated with different roles of the user—for example the role of the subscriber as a private person for one subscription and the role of the subscriber as a patent attorney for a second subscription. Separation of wireless communication according to these two different roles supported by the separate subscription accounts can provide a variety of benefits including separating private expenses from business expenses and separating confidential professional information from private individual information. The user may use a first subscription supported by a first virtual UE instance for use when playing a distributed video game that desirably receives a high quality of service (QoS) and may use a second subscription supported by a second virtual UE instance for ordinary wireless communication such as voice calls, text messages, internet browsing using a standard QoS. It is noted that the two different service subscriptions need not be supported by the same wireless communication subscriber.

In an embodiment, the physical UE comprises a baseband processor that interfaces with the application processor to support wireless communication processes. The baseband processor may provide modulation and demodulation functions. The baseband processor may provide physical layer processing and/or wireless communication protocol specific processing. The baseband processor may provide inputs to a radio transceiver and receive outputs from the radio transceiver. In an embodiment, the baseband processor is integrated with the radio transceiver.

The baseband processor provides a plurality of software interfaces to the application processor. Each separate virtual UE may use a separate software interface of the baseband processor. In an embodiment, the baseband processor executes a different instance of a radio protocol stack (e.g., a layered software architecture supporting radio related processing) for each different software interface. In one circumstance, the different instances of the radio protocol stack may be instantiated from the same radio protocol stack software (e.g., two radio stack instances instantiated from the same radio protocol stack software). In another circumstance, however, a first virtual UE may be supported by an instance of a first radio protocol stack software and a second virtual UE may be supported by an instance of a second different radio protocol stack software, for example when the wireless UE attachments of the two different virtual UEs are associated with two different telecommunications protocols.

The baseband processor takes care of aggregating communication outputs from two or more virtual UEs for radio transmission. The baseband processor separates an aggregated radio reception and routes received communications to the appropriate virtual UEs. In an embodiment, the physical UE uses multiple input and multiple output techniques to separate wireless UE attachments for each different eSIM profile. Alternatively, in another embodiment, a single antenna is used to conduct wireless communication associated with two or more separate wireless UE attachments at the same time. The multi-eSIM profile operation may involve simultaneous operation of two different radios/antennas at the same time: a first radio configured for a first frequency range using a first antenna and a second radio configured for a second frequency range using a second antenna. The multi-eSIM profile operation may use a single radio and a single antenna in a first frequency range and the same radio and the same antenna at a second frequency range. The multi-eSIM profile operation may involve overlaying two different communication sessions at the same time using a single radio and a single antenna such that the radio transmits and receives at the same time in two different frequency bands.

In an embodiment, a user-facing application executing on the physical UE may select a desired one of a plurality of eSIM profiles stored on the physical UE, for example based on charging policies and/or different QoSs associated with different subscription plans associated with different eSIM profiles. A virtual UE manager application on the physical UE may cause such user applications to execute in a selected one of a plurality of virtual UE instances. Alternatively, the user application may execute separately from the virtual UE instances and may call an API of a selected one of the virtual UE instances to conduct communication activities.

It is understood that the multi-eSIM profile operation is transparent to the network(s). When the first virtual UE transmits first eSIM profile credentials it is deemed a first mobile phone and handled accordingly; when the second virtual UE transmits second eSIM credentials it is deemed a second mobile phone and handled accordingly by the network. Said in other words, the RAN and/or cell site view different UE attachments from different virtual UEs of the same physical UE as if each different UE attachment were a different physical UE. These changes to support a plurality of virtual UEs on a single physical UE are specific technical solutions to a technical problem.

Turning now to FIG. 1A, a communication system 100 is described. In an embodiment, the system 100 comprises a user equipment (UE) 102 that communicates via a network 136 to other UEs 137, with content sources 138, and/or application servers 139. The UE 102 may communicate via the network 136 with other communication devices or communication systems not shown in FIG. 1A. In an embodiment, the network 136 comprises one or more public networks, one or more private networks, or a combination thereof. In an embodiment, the network 136 may comprise, at least in part, a 5G communication network. 5G communication networks are discussed further hereinafter with reference to FIG. 5A and FIG. 5B.

The UE 102 communicates with the network 136 via one or more wireless communication links provided by a cell site 134. The cell site 134 may provide a wireless communication link to the UE 102 according to a 5G, a long term evolution (LTE), a code division multiple access (CDMA), or a global system for mobile communications (GSM) telecommunications protocol. The cell site 134 may provide a first wireless link 130 to the UE 102 according to a first telecommunications protocol and provide a second wireless link 132 to the UE 102 according to a second telecommunications protocol that is different from the first telecommunications protocol. The cell site 134 may provide a first wireless link 130 and a second wireless link 132 to the UE 102 according to the same telecommunications protocol. The first wireless link 130 and the second wireless link 132 may be provided by the cell site 134 to the UE 102 at the same time or concurrently.

In an embodiment, the UE 102 comprises an application processor 104, a baseband processor 106, a memory 108, and at least one radio transceiver 110. The UE 102 may be a mobile phone, a smart phone, a personal digital assistant (PDA), a wearable computer, a headset computer, a laptop computer, a notebook computer, a tablet computer, or an Internet of things (IoT) device. The memory 108 comprises a non-transitory memory portion that stores a virtual UE application 112, a first eSIM profile 114, and a second eSIM profile 116. In an embodiment, the virtual UE application 112 may be stored in a non-transitory memory portion of a main memory of the UE 102 or of the application processor 104, and the first eSIM profile 114 and the second eSIM profile 116 may be stored in an eSIM chip of the UE 102. In an embodiment, the first eSIM profile 114 is stored in a first eSIM chip of the UE 102 and the second eSIM profile 116 is stored in a second eSIM chip of the UE 102. The first eSIM chip may store a plurality of eSIM profiles or just one eSIM profile, and the second eSIM chip may store a plurality of eSIM profiles or just one eSIM profile. It is understood that the memory 108 may store any number of eSIM profiles. It is understood that the memory 108 may comprise any number of eSIM chips.

The application processor 104 may execute a plurality of instances of the virtual UE application 112, for example a first virtual UE application instance 120 and a second virtual UE application instance 122. The first virtual UE application instance 120 may conduct communications via the first wireless link 130, and the second virtual UE application instance 122 may conduct communications via the second wireless link 132. At least part of the time, the application processor 104 may execute both virtual UE application instances 120, and 122 concurrently. While the example of the application processor 104 executing two virtual UE instances concurrently is described in detail below, it is understood that the application processor 104 may execute three of more virtual UE instances concurrently. Executing an instance of the virtual UE application 112 is understood to begin by the application processor 104 particularizing or configuring the specific instance of the virtual UE application 112, for example by configuring the instance to access a specific one of the eSIM profiles 114, 116 and possibly configuring the instance to interwork with a specific software interface provided by the baseband processor 106. Launching execution of an instance of the virtual UE application 112 and particularizing or configuring the instance may be referred to as instantiating the instance or referred to as an instantiation process.

The first virtual UE application instance 120 is configured at run-time (e.g., during the instantiation process) to access and use the first eSIM profile 114 in attaching to the cell site 134. When the first virtual UE application instance 120 requests to attach to the cell site 134, the first virtual UE application instance 120 accesses credentials from the first eSIM profile 114 and presents these credentials to the cell site 134 for authentication into the radio access network (RAN). These credentials may comprise a phone number, a mobile subscriber identity (MSID), an international mobile subscriber identity (IMSI), and/or a network access key. If the cell site 134 and/or the network 136 successfully authenticates the first virtual UE application instance 120, the cell site 134 grants a first UE attachment to the first virtual UE application instance 120 (e.g., grants a first UE attachment to the UE 102). This first UE attachment is associated with or is identical with the first wireless link 130.

The second virtual UE application instance 122 is configured at run-time (e.g., during the instantiation process) to access and use the second eSIM profile 116 in attaching to the cell site 134. When the second virtual UE application instance 122 requests to attach to the cell site 134, the second virtual UE application instance 122 access credentials from the second eSIM profile 116 and presents these different credentials to the cell site 134 for authentication into the RAN. The credentials presented by the second virtual UE application instance 122 may comprise the same phone number, MSID, and/or IMSI as presented by the first virtual UE application instance 120, but the second virtual UE application instance 122 presents a different network access key from the first virtual UE application instance 120. In another embodiment, however, the credentials presented by the second virtual UE application instance 122 may comprise a different phone number, MSID, and/or IMSI than the first virtual UE application instance 120 presented (e.g., when the UE 102 is associated with two different wireless communication subscription accounts). When presenting credentials for attachment to the cell cite 134, both the first virtual UE application instance 120 and the second virtual UE application instance 122 may present the same mobile equipment identity (MEID) or other unique identity of the UE 102. If the cell site 134 and/or the network 136 successfully authenticates the second virtual UE application instance 122, the cell sites grants a second UE attachment to the second virtual UE application instance 122 (e.g., grants a second UE attachment to the UE 102).

While there may be formal distinctions between a UE attachment and a wireless link, the present disclosure may use these terms interchangeably. From the view of the cell site 134, the first wireless link 130 is deemed a first UE attachment to a first UE (e.g., to the first virtual UE application instance 120) and the second wireless link 132 is deemed a second UE attachment to a second UE (e.g., to the second virtual UE application instance 122).

In an embodiment, a virtual UE manager application 124 may determine what eSIM profile 114, 116 to associate with a virtual UE application instance 120, 122 when launching the virtual UE application instance 120, and 122. In an embodiment, when a user launches a user application 126 on the UE 102, the user application 126 may present a user interface on the UE 102 prompting the user to select a wireless communication option to use when operating the user application 126, and this selection may be conveyed from the user application 126 to the virtual UE manager application 124. This option may offer selection of two or more different wireless service providers. This option may offer selection of two or more different wireless communication service subscriptions. The different subscriptions may be with the same service provider or with different service providers. The different subscriptions may be associated with different quality of services (QoSs) and/or different subscription payment rates. In an embodiment, this option may allow the user to select to temporarily or quasi-permanently associate the user application to a specific eSIM profile, specific wireless service provider, a specific wireless communication service subscription, or a specific QoS such that when the user application is launched, the virtual UE manager application 124 automatically instantiates a virtual UE application instance configured with the appropriate eSIM profile (e.g., the eSIM profile that provides the desired service provider, service subsection, or QoS). If the appropriate eSIM profile is already in use, the virtual UE manager application 124 and/or the user application may inform the user of a conflict and ask the user to select an appropriate next action. A next action may be cancelling execution of another user application that is currently using the desired eSIM profile. A next action may be selecting an alternative eSIM profile, an alternative service subscription, or an alternative QoS.

In an embodiment, the baseband processor 106 provides a plurality of software interfaces to the application processor 104. The first virtual UE application instance 120 communicates with the baseband processor 106 using a first software interface provided by the baseband processor 106, and the second virtual UE application instance 122 communicates with the baseband processor 106 using a second software interface provided by the baseband processor 106. From the view of the first virtual UE application instance 120 it has a dedicated communication link via the baseband processor 106 and the radio transceiver 110 over the first wireless link 130 to the cell site 134. From the view of the second virtual UE application instance 122 it, too, has a dedicated communication link via the baseband processor 106 and the radio transceiver 110 over the second wireless link 132 to the cell site 134.

Each software interface may be associated or communicatively coupled within the baseband processor to an associated radio protocol stack instance executing on the baseband processor. A first software interface (and the first virtual UE application instance 120) may be communicatively coupled to a first radio protocol stack instance associated with a first telecommunication protocol, and a second software interface (and the second virtual UE application instance 122) may be communicatively coupled to a second radio protocol stack instance associated with the second telecommunication protocol. In a first circumstance the first and second telecommunication protocol may be the same. In a second circumstance, however, the first telecommunication protocol may be different from the second telecommunication protocol. For example, the first radio protocol stack instance may implement a 5G telecommunications protocol and the second radio protocol stack instance may implement a long term evolution (LTE) telecommunications protocol. For example, the first radio protocol stack instance may implement a 5G telecommunications protocol and the second radio protocol stack instance may implement a code division multiple access (CDMA) telecommunications protocol. For example the first radio protocol stack instance may implement a 5G telecommunications protocol and the second radio protocol stack instance may implement a global system for mobile communications (GSM) telecommunications protocol. For example, the first radio protocol stack instance may implement a LTE telecommunications protocol and the second radio protocol instance may implement a CDMA telecommunications protocol. For example, the first radio protocol stack instance may implement a LTE telecommunications protocol and the second radio protocol stack instance may implement a GSM telecommunications protocol. For example, the first radio protocol stack instance may implement a CDMA telecommunications protocol and the second radio protocol stack instance may implement a GSM telecommunications protocol.

The baseband processor 106 interworks with the radio transceiver 110 to concurrently manage radio communications of the first virtual UE application instance 120 via the first wireless link 130 associated with a first UE attachment and the radio communications of the second virtual UE application instance 122 via the second wireless link 132 associated with a second different UE attachment. In an embodiment, the UE 102 comprises multiple antennas, and the first wireless link 130 may be supported by a first antenna while the second wireless link 132 may be supported by a second antenna. In an embodiment the first wireless link 130 is supported by two or more antennas of the UE 102. In an embodiment, the second wireless link 132 is supported by two or more antennas of the UE 102. In an embodiment, the first wireless link 130 is carried over a first frequency band or frequency channel while the second wireless link 132 is carried over a second different frequency band or frequency channel.

In an embodiment, the baseband processor 106 modulates the inputs from each of the first virtual UE application instance 120 and the second virtual UE application instance 122 separately, combines the modulated signals, and transmits them via the radio transceiver 110 on a single frequency band to the cell site 134. The baseband processor 106 may separate a single signal received from the cell site 134 into two separate signals—a first receive signal to provide to the first virtual UE application instance 120 and a second receive signal to provide to the second virtual UE application instance 122. In this embodiment, the baseband processor 106 may modulate the two different inputs with different Walsh codes before combining them for transmitting via the radio transceiver 110. In this embodiment, the baseband processor 106 may separate two separate receive signals by demodulating the received signal with one Walsh code to extract a first receive signal and demodulate the same received signal with a second Walsh code to extract a second receive signal. In another embodiment, a different coding process may be used than Walsh codes to segregate the two different signals. It is understood that at least part of the segregation between the two separate receive signals and the two separate transmit signals may be provided by two separate radio protocol stack instances.

It is understood that the UE 102 may sometimes establish only a single wireless link to the cell site 134 under some circumstances, for example when only one user application 126 is executed at that time or if only one communication function of the UE 102 is active at that time. The virtual UE manager application 124 may decide which eSIM profile 114, 116 to use for communicating with the cell site 134 based on one or more rules. The rule may define criteria such as costs of using one eSIM profile 114, 116 versus the other, the QoS associated with one eSIM profile 114, 116 versus the other; the communication traffic congestion associated with one eSIM profile 114, 116 versus the other.

Thus, when the virtual UE manager application 124 instantiates the first virtual UE application instance 120, the first virtual UE application instance 120 accesses the first eSIM profile 114 stored in the non-transitory portion of memory 108, establishes a first UE attachment to a radio access network (e.g., cell site 134) via the software interface of the baseband processor 106 based on credentials accessed from the first eSIM profile 114, and conducts a first wireless communication session via the first UE attachment. This first UE attachment is associated with the first wireless link 130. This first wireless communication session is conducted over the first wireless link 130. When the virtual UE manager application 124 instantiates the second virtual UE application instance 122, the second virtual UE application instance 122 accesses the second eSIM profile 116 stored in the non-transitory portion of memory 108, establishes a second UE attachment to a radio access network (e.g., cell site 134) via the software interface of the baseband processor 106 based on credentials accessed from the second eSIM profile 116, and conducts a second wireless communication session via the second UE attachment. In some circumstances the second virtual UE application instance 122 conducts the second wireless communication session at the same time (e.g., concurrently) the first virtual UE application instance 120 conducts the first wireless communication session. In other circumstances, the second virtual UE application instance 122 conducts the second wireless communication session at a different time (e.g., non-concurrently) than the first virtual UE application instance 120 conducts the first wireless communication session. This second UE attachment is associated with the second wireless link 132. This second wireless communication session is conducted over the second wireless link 132.

In an embodiment, the virtual UE manager application 124 instantiates a third virtual UE application instance, the third virtual UE application instance accesses a third eSIM profile stored in the non-transitory portion of memory 108, establishes a third UE attachment to a radio access network (e.g., cell site 134) via the software interface of the baseband processor 106 based on credentials accessed from the third eSIM profile, and conducts a third wireless communication session via the third UE attachment. In some circumstances the third virtual UE application instance conducts the third wireless communication session at the same time (e.g., concurrently) the first virtual UE application instance 120 and the second virtual UE application instance 122 conduct the first wireless communication session and the second wireless communication session. This third UE attachment is associated with a third wireless link. This third wireless communication session is conducted over the third wireless link.

Figure 1B:
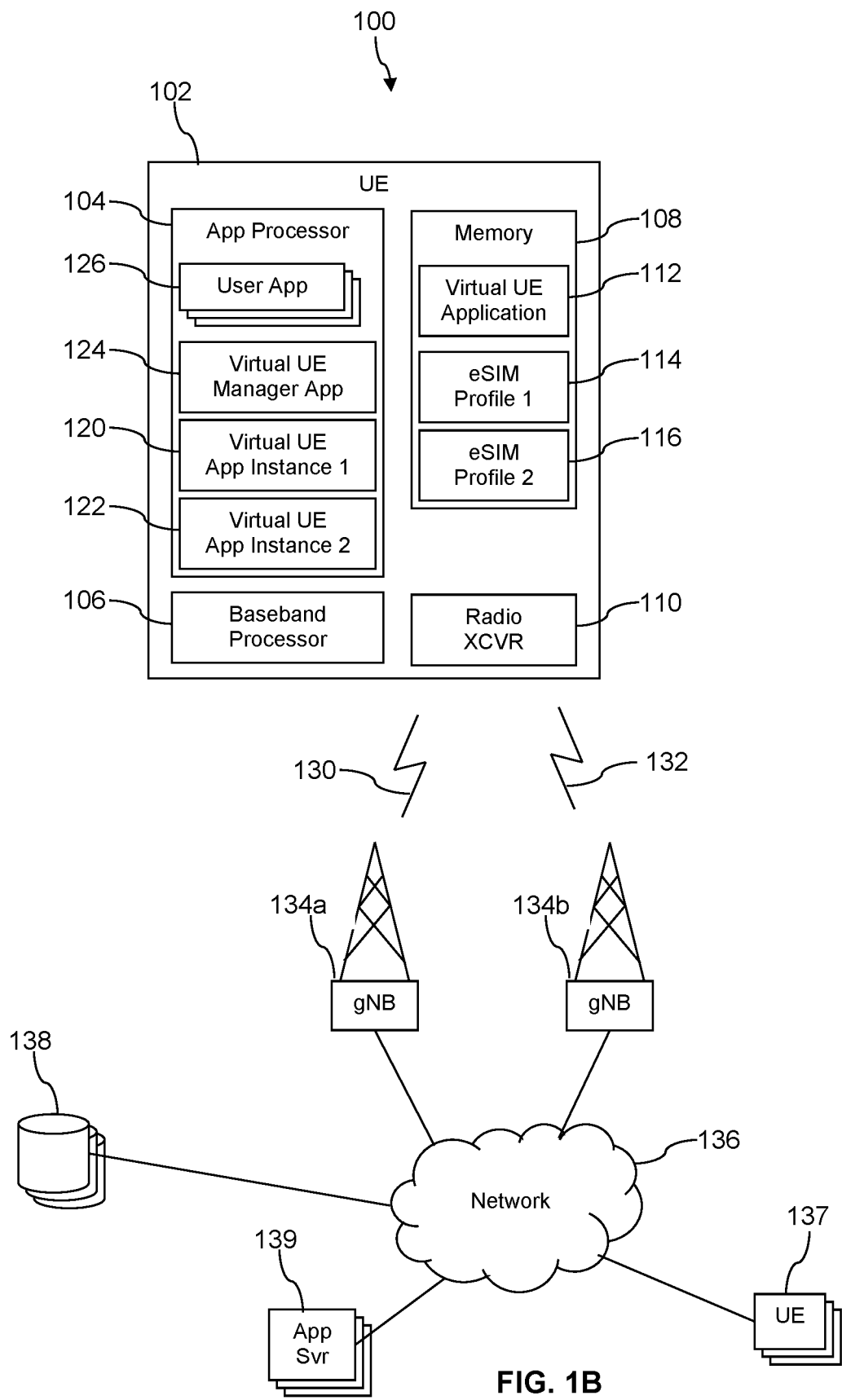
FIG. 1B is a block diagram of another communication system according to an embodiment of the disclosure.

Turning now to FIG. 1B, an alternative operating scenario of the UE 102 is described. The system 100 and the UE 102 depicted in FIG. 1B are substantially similar to the system 100 and UE 102 depicted in FIG. 1A, with the exception that the first wireless link 130 (e.g., the first UE attachment) is attached to a first cell site 134a and the second wireless link 132 (e.g., the second UE attachment) is attached to a second cell site 134b. Such an operating scenario may occur under a variety of different circumstances. For example, when the second wireless link 132 is established the first cell site 134a may be unable to offer a wireless link to the UE 102 and instead the second wireless link 132 is attached to the second cell site 134b which is still within range of the UE 102. For example, the wireless links 130, 132 may have been attached to the first cell site 134a initially, but the second wireless link 132 has since been handed over to the second cell site 134b (and the first wireless link 130 may soon be handed over to the second cell site 134b also, but at least transiently remains attached to the first cell site 134a). For example, the first cell site 134a is associated with a first wireless communication service provider network, and the second cell site 134b is associated with a second wireless communication service provider network. In this example, the first eSIM profile 114 comprises network credentials associated with the first wireless communication service provider network, and the second eSIM profile 116 comprises network credentials associated with the second wireless communication service provider network.

Thus, when the virtual UE manager application 124 instantiates the first virtual UE application instance 120, the first virtual UE application instance 120 accesses the first eSIM profile 114 stored in the non-transitory portion of memory 108, establishes a first UE attachment to a radio access network (e.g., cell site 134a) via the software interface of the baseband processor 106 based on credentials accessed from the first eSIM profile 114, and conducts a first wireless communication session via the first UE attachment. This first UE attachment is associated with the first wireless link 130. This first wireless communication session is conducted over the first wireless link 130. When the virtual UE manager application 124 instantiates the second virtual UE application instance 122, the second virtual UE application instance 122 accesses the second eSIM profile 116 stored in the non-transitory portion of memory 108, establishes a second UE attachment to a radio access network (e.g., cell site 134b) via the software interface of the baseband processor 106 based on credentials accessed from the second eSIM profile 116, and conducts a second wireless communication session via the second UE attachment. In some circumstances the second virtual UE application instance 122 conducts the second wireless communication session at the same time (e.g., concurrently) the first virtual UE application instance 120 conducts the first wireless communication session. In other circumstances, the second virtual UE application instance 122 conducts the second wireless communication session at a different time (e.g., non-concurrently) than the first virtual UE application instance 120 conducts the first wireless communication session. This second UE attachment is associated with the second wireless link 132. This second wireless communication session is conducted over the second wireless link 132.

Figure 2:
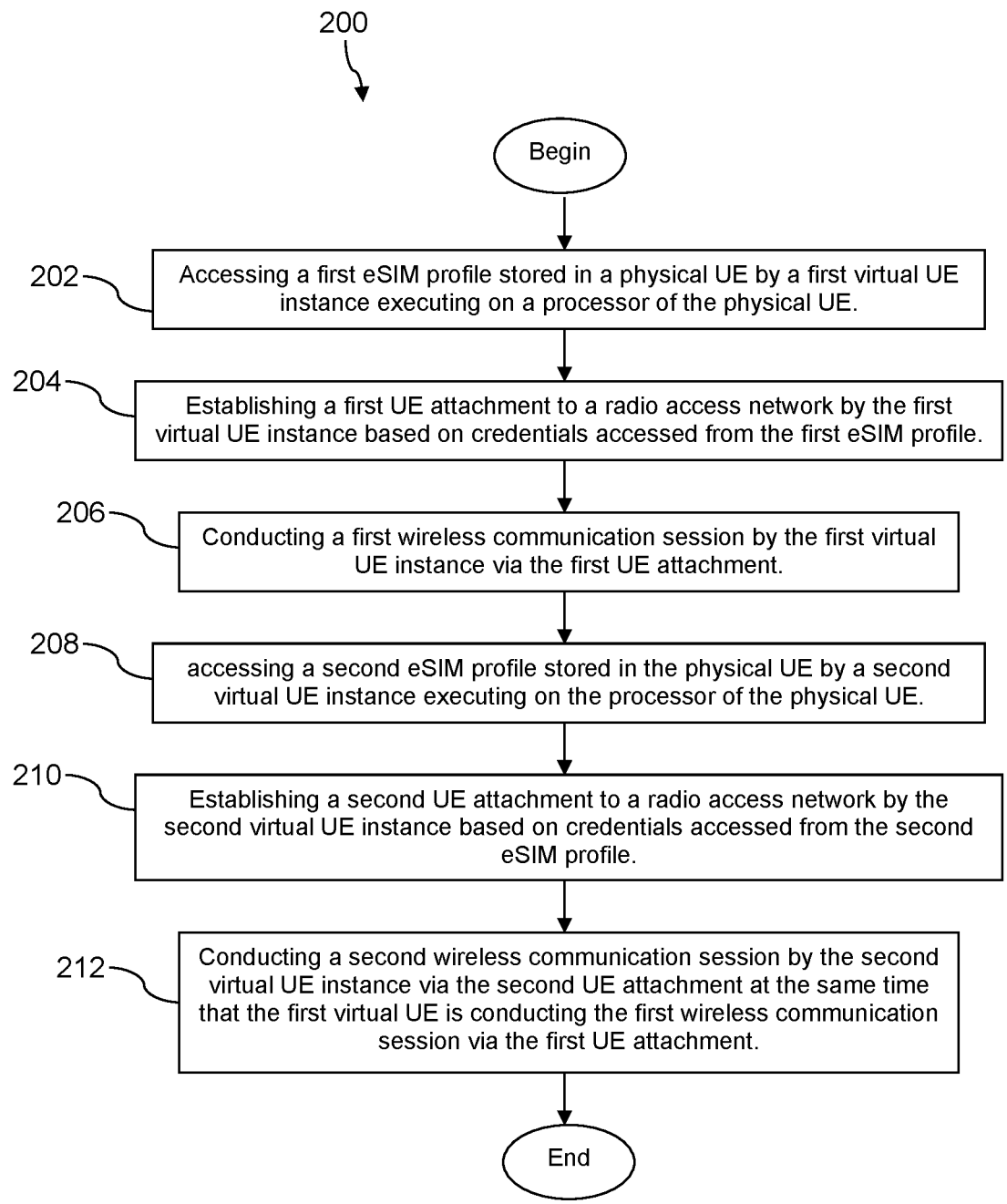
FIG. 2 is a flow chart of a method according to an embodiment of the disclosure.

Turning now to FIG. 2, a method 200 is described. In an embodiment, the method 200 is a method of wirelessly communicating by a wireless communication device using two different embedded subscriber identity module (eSIM) profiles to establish two different user equipment (UE) radio access network (RAN) attachments concurrently. At block 202, the method 200 comprises accessing a first eSIM profile stored in a physical UE by a first virtual UE instance executing on a processor of the physical UE.

At block 204, the method 200 comprises establishing a first UE attachment to a radio access network by the first virtual UE instance based on credentials accessed from the first eSIM profile. At block 206, the method 200 comprises conducting a first wireless communication session by the first virtual UE instance via the first UE attachment.

At block 208, the method 200 comprises accessing a second eSIM profile stored in the physical UE by a second virtual UE instance executing on the processor of the physical UE. At block 210, the method 200 comprises establishing a second UE attachment to a radio access network by the second virtual UE instance based on credentials accessed from the second eSIM profile. At block 212, the method 200 comprises conducting a second wireless communication session by the second virtual UE instance via the second UE attachment at the same time that the first virtual UE is conducting the first wireless communication session via the first UE attachment.

In an embodiment, the first UE attachment attaches to a first radio access network and the second UE attachment attaches to a second radio access network. In an embodiment, the first radio access network is operated by a first wireless communication service provider and the second radio access network is operated by a second wireless communication service provider. In another embodiment, the first UE attachment and the second UE attachment attach to the same radio access network. In an embodiment, the first UE attachment is based on a first subscription account and the second UE attachment is based on a second different subscription account.

Figure 3:
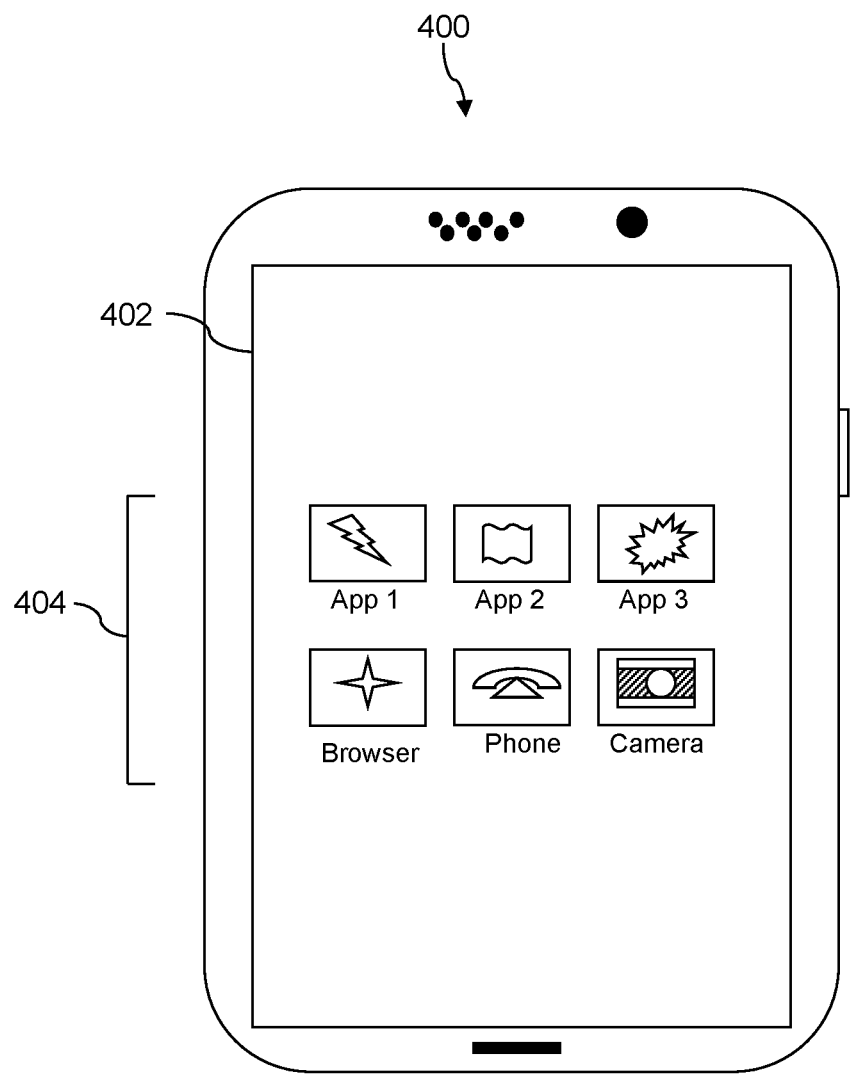
FIG. 3 is an illustration of a user equipment according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
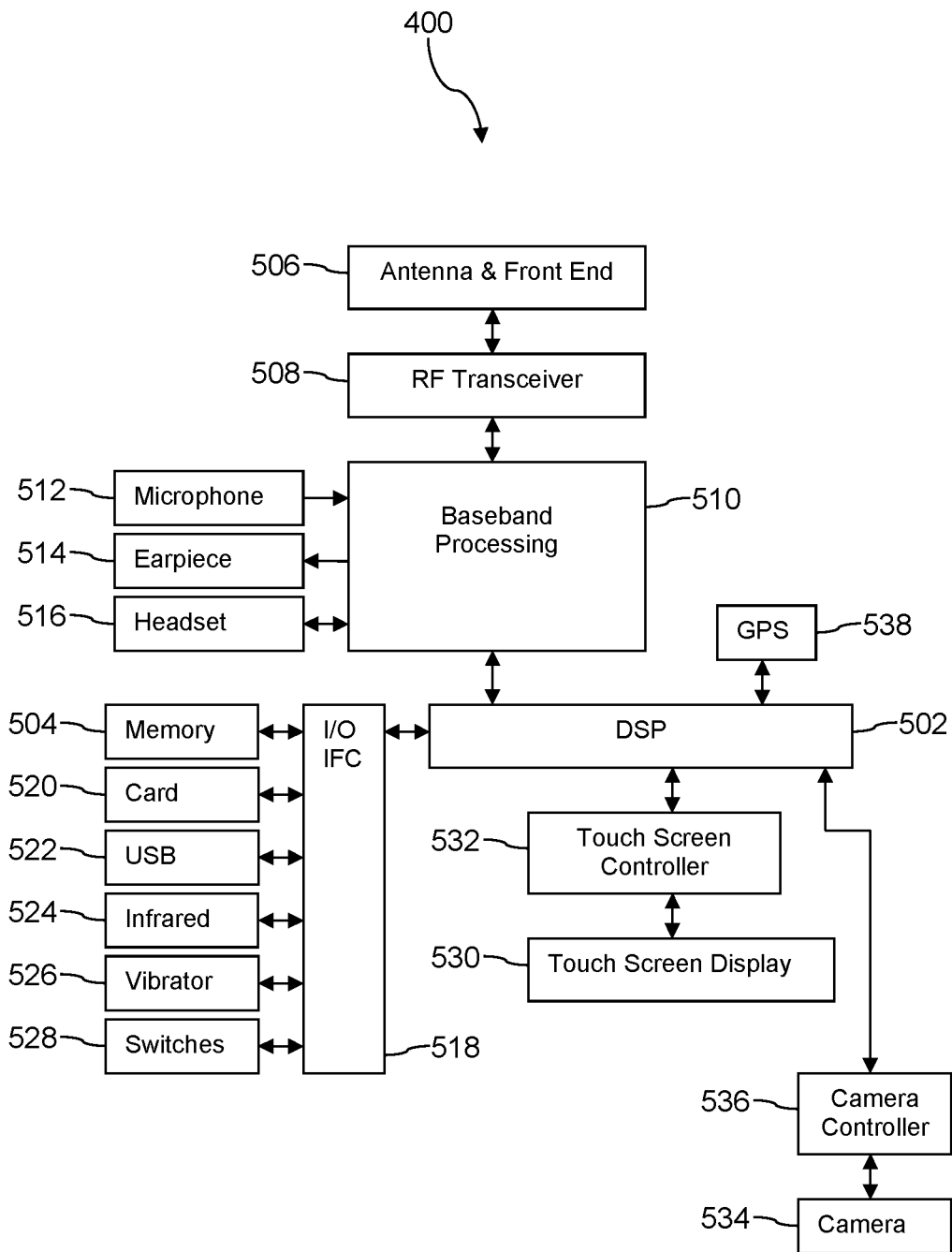
FIG. 4 is a block diagram of a hardware architecture of a user equipment according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. In some contexts the DSP 502 may be referred to as an application processor. For example, the DSP 502 may perform the same activities performed by the application processor 104 described above with reference to FIG. 1A and FIG. 1B.

As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
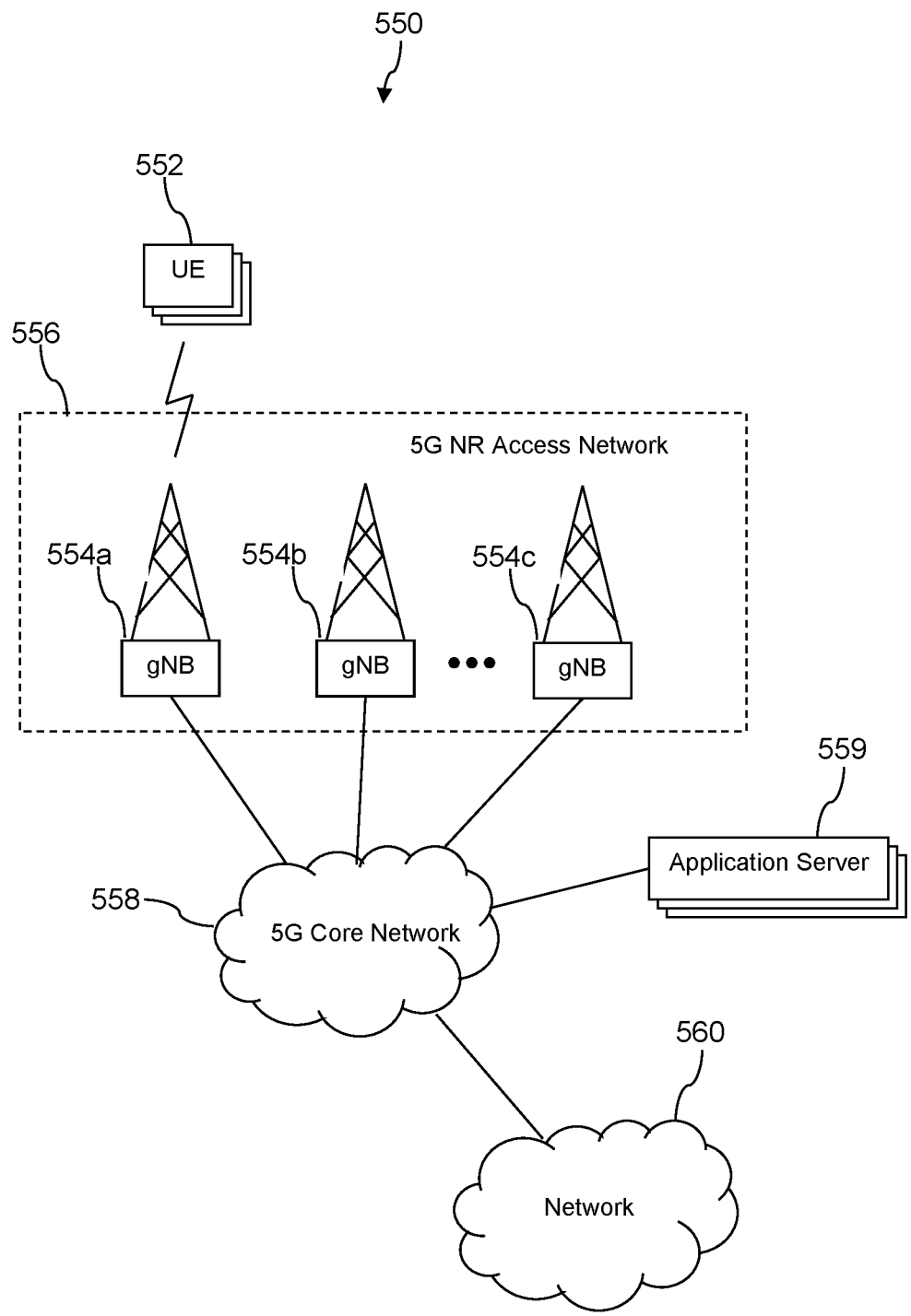
FIG. 5A is a block diagram of a 5G communication network according to an embodiment of the disclosure.

Turning now to FIG. 5A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split support flexibility in deploying the DU and CU. The CU may be hosted in a regional cloud data center. The DU may be co-located with the RU, or the DU may be hosted in an edge cloud data center.

Figure 5B:
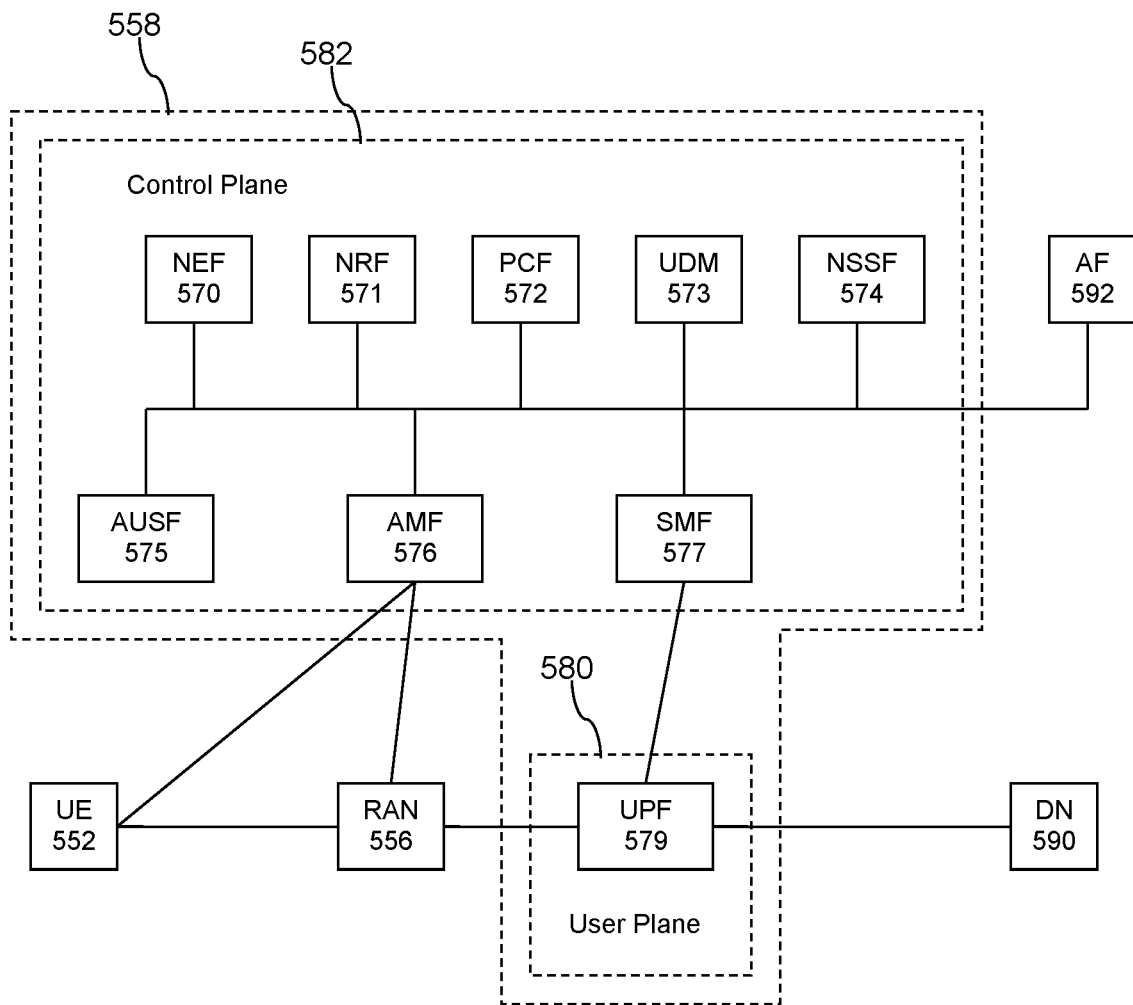
FIG. 5B is a block diagram of a 5G core network according to an embodiment of the disclosure.

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF)

574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6A:
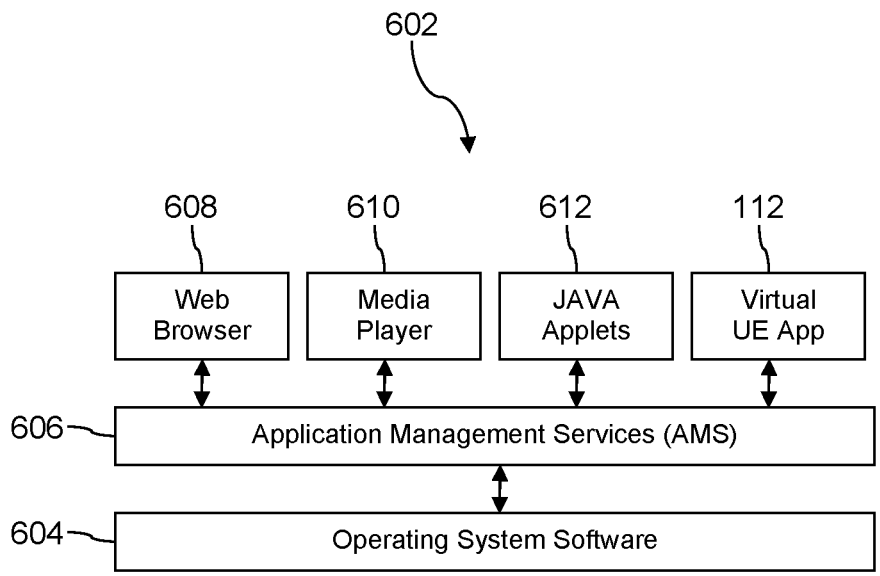
FIG. 6A is a block diagram of a software architecture of a user equipment according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, JAVA applets 612, and a virtual UE application 112. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
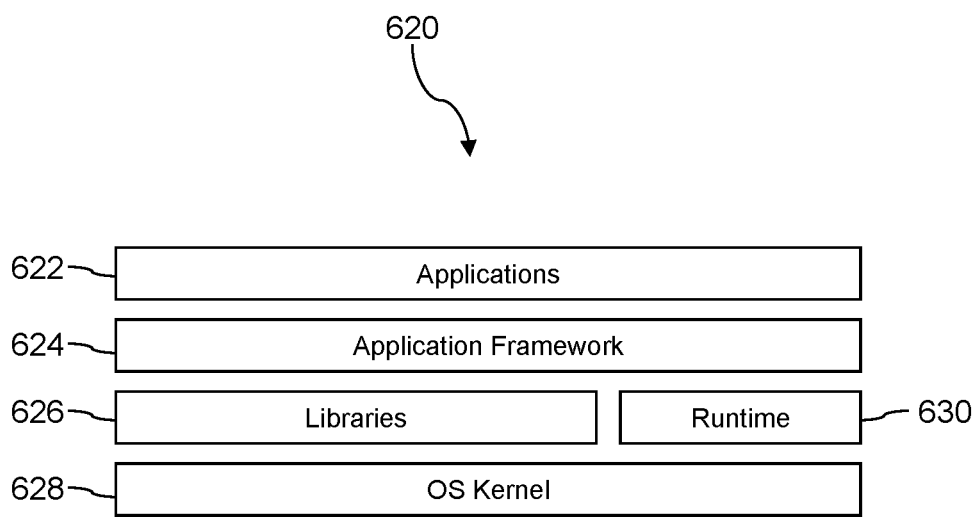
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
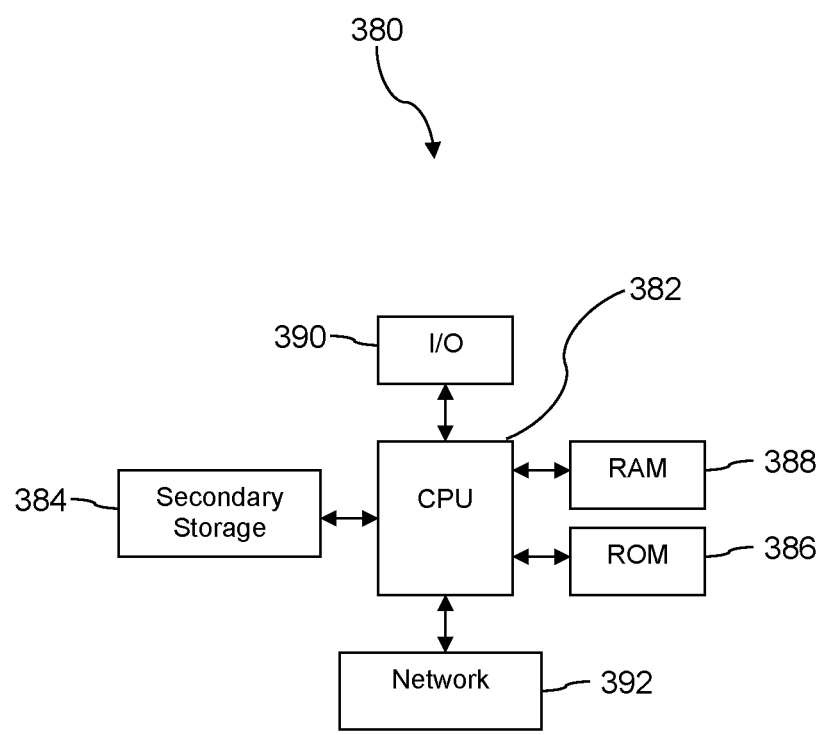
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A wireless communication device for establishing two different user equipment (UE) radio access network (RAN) attachments concurrently, comprising:
    a radio transceiver;
    a baseband processor communicatively coupled to the radio transceiver providing a software interface to support a plurality of virtual user equipment (UE) application instances concurrently;
    an application processor communicatively coupled to the baseband processor;
    a non-transitory memory;
    a virtual UE application stored in the non-transitory memory that, when executed by the application processor as a first virtual UE application instance, the first virtual UE application instance:
        accesses a first eSIM profile stored in the non-transitory memory,
        establishes a first UE attachment to a radio access network via the software interface of the baseband processor based on credentials accessed from the first eSIM profile, and
        conducts a first wireless communication session via the first UE attachment,
    and when executed by the application processor as a second virtual UE application instance concurrent with the first virtual UE application instance, the second virtual UE application instance:
        accesses a second eSIM profile stored in the non-transitory memory,
        establishes a second UE attachment to a radio access network via the software interface of the baseband processor based on credentials accessed from the second eSIM profile, and
        conducts a second wireless communication session via the second UE attachment at the same time the first virtual UE application instance conducts the first wireless communication session.

2. The wireless communication device of claim 1, wherein the wireless communication device is a user equipment (UE) that is a mobile phone, a smart phone, a personal digital assistant (PDA), a wearable computer, a headset computer, a laptop computer, a notebook computer, a tablet computer, or an Internet of things (IoT) device.

3. The wireless communication device of claim 1, wherein the virtual UE application, when executed by the application processor as a third virtual UE application instance, the third virtual UE application instance:
    accesses a third eSIM profile stored in the non-transitory memory,
    establishes a third UE attachment to a radio access network via the software interface of the baseband processor based on credentials accessed from the third eSIM profile, and
    conducts a third wireless communication session via the third UE attachment.

4. The wireless communication device of claim 1, wherein the radio transceiver provides the first UE attachment according to a 5G, a long term evolution (LTE), a code division multiple access (CDMA), or a global system for mobile communications (GSM) telecommunications protocol and provides the second UE attachment according to a 5G, a long term evolution (LTE), a code division multiple access (CDMA), or a global system for mobile communications (GSM) telecommunications protocol.

5. The wireless communication device of claim 4, wherein the radio transceiver provides the first UE attachment according to a first telecommunications protocol and provides the second UE attachment according to a second telecommunications protocol that is different from the first telecommunications protocol.

6. The wireless communication device of claim 1, wherein the first virtual UE application instance establishes the first UE attachment to a first radio access network and the second virtual UE application instance establishes the second UE attachment to a second radio access network that is different from the first radio access network.

7. The wireless communication device of claim 1, wherein the application processor executes a first user application that selects the first eSIM profile and uses the first wireless communication session.

8. The wireless communication device of claim 7, wherein the first user application presents a user interface on the wireless communication device that prompts a user to select one of a plurality of eSIM profiles.

9. A method of wirelessly communicating by a wireless communication device using two different embedded subscriber identity module (eSIM) profiles to establish two different user equipment (UE) radio access network (RAN) attachments concurrently, comprising:
 accessing a first eSIM profile stored in a physical UE by a first virtual UE instance executing on a processor of the physical UE;
 establishing a first UE attachment to a radio access network by the first virtual UE instance based on credentials accessed from the first eSIM profile;
 conducting a first wireless communication session by the first virtual UE instance via the first UE attachment;
 accessing a second eSIM profile stored in the physical UE by a second virtual UE instance executing on the processor of the physical UE;
 establishing a second UE attachment to a radio access network by the second virtual UE instance based on credentials accessed from the second eSIM profile; and
 conducting a second wireless communication session by the second virtual UE instance via the second UE attachment at the same time that the first virtual UE is conducting the first wireless communication session via the first UE attachment.

10. The method of claim 9, wherein the first UE attachment attaches to a first radio access network and the second UE attachment attaches to a second radio access network.

11. The method of claim 10, wherein the first radio access network is operated by a first wireless communication service provider and the second radio access network is operated by a second wireless communication service provider.

12. The method of claim 9, wherein the first UE attachment and the second UE attachment attach to the same radio access network.

13. The method of claim 12, wherein the first UE attachment is based on a first subscription account and the second UE attachment is based on a second different subscription account.

14. The method of claim 9, wherein the first eSIM profile comprises wireless communication service provider data and wireless communication service subscriber data.

15. The method of claim 9, wherein the physical UE is a mobile phone, a smart phone, a personal digital assistant (PDA), a wearable computer, a headset computer, a laptop computer, a notebook computer, a tablet computer, or an Internet of things (IoT) device.

16. A wireless communication device for establishing two different user equipment (UE) radio access network (RAN) attachments, comprising:
 a radio transceiver;
 a baseband processor communicatively coupled to the radio transceiver providing a software interface to support a plurality of virtual user equipment (UE) application instances;
 an application processor communicatively coupled to the baseband processor;
 a non-transitory memory;
 a virtual user equipment (UE) application stored in the non-transitory memory that, when executed by the application processor as a first virtual UE instance, the first virtual UE application instance:
  accesses a first eSIM profile stored in the non-transitory memory,
  establishes a first UE attachment to a radio access network via the baseband processor based on credentials accessed from the first eSIM profile, and
  conducts a first wireless communication session via the first UE attachment,
 and when executed by the application processor as a second virtual UE application instance, the second virtual UE application instance accesses a second eSIM profile stored in the non-transitory memory,
  establishes a second UE attachment to a radio access network via the baseband processor based on credentials accessed from the second eSIM profile, and
  conducts a second wireless communication session via the second UE attachment.

17. The wireless communication device of claim 16, wherein the first eSIM profile is associated with a first wireless communication service subscription account and the second eSIM profile is associated with a second wireless communication service subscription account different from the first wireless communication subscription account.

18. The wireless communication device of claim 16, wherein the application processor further executes a first user application that communicates via the first wireless communication session and executes a second user application that communicates via the second wireless communication session.

19. The wireless communication device of claim 16, wherein the non-transitory memory comprises a first eSIM chip that stores the first eSIM profile and a second eSIM chip that stores the second eSIM profile.

20. The wireless communication device of claim 16, wherein the radio transceiver maintains the first wireless communication session and the second wireless communication session over a single antenna of the wireless communication device.

* * * * *